(12) United States Patent
Brillon et al.

(10) Patent No.: US 11,767,772 B1
(45) Date of Patent: Sep. 26, 2023

(54) PASSIVELY ROTATING A ROTATING STRUCTURE OF A GAS TURBINE ENGINE DURING TRANSPORTATION

(71) Applicant: Pratt & Whitney Canada Corp., Longueuil (CA)

(72) Inventors: Louis Brillon, Varennes (CA); Bruno Martin, Saint-Jean-sur-Richelieu (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/722,894

(22) Filed: Apr. 18, 2022

(51) Int. Cl.
| | |
|---|---|
| *F01D 25/28* | (2006.01) |
| *F02C 7/20* | (2006.01) |
| *B64F 5/50* | (2017.01) |
| *F02C 7/32* | (2006.01) |

(52) U.S. Cl.
CPC .............. *F01D 25/285* (2013.01); *B64F 5/50* (2017.01); *F02C 7/20* (2013.01); *B65D 2585/6877* (2013.01); *F02C 7/32* (2013.01); *F05D 2220/32* (2013.01); *F05D 2230/72* (2013.01); *F05D 2260/02* (2013.01)

(58) Field of Classification Search
CPC .. F01D 25/285; B64F 5/50; F02C 7/20; F02C 7/32; B65D 2585/6877; F05D 2220/32; F05D 2230/72; F05D 2260/02
See application file for complete search history.

(56) References Cited

U.S. PATENT DOCUMENTS

| | | | |
|---|---|---|---|
| 7,857,578 B2 * | 12/2010 | Urac ....................... | F16C 41/04 |
| | | | 415/214.1 |
| 10,145,362 B2 | 12/2018 | Eriksen | |
| 10,539,053 B2 | 1/2020 | MacMahon | |
| 2009/0235638 A1 * | 9/2009 | Jain ........................ | F02K 1/15 |
| | | | 60/262 |
| 2017/0335713 A1 * | 11/2017 | Klemen ................. | F01D 15/10 |

\* cited by examiner

*Primary Examiner* — Gerald L Sung
*Assistant Examiner* — Rene D Ford
(74) *Attorney, Agent, or Firm* — Getz Balich LLC

(57) ABSTRACT

A powerplant system is provided that includes a gas turbine engine system and an actuation system. The gas turbine engine system includes a rotating structure, a stationary structure and one or more bearings rotatably mounting the rotating structure to the stationary structure. The actuation system is configured to passively rotate the rotating structure about a rotational axis during transportation of the gas turbine engine system.

17 Claims, 8 Drawing Sheets

PASSIVELY ROTATING A ROTATING STRUCTURE OF A GAS TURBINE ENGINE DURING TRANSPORTATION

TECHNICAL FIELD

This disclosure relates generally to a gas turbine engine and, more particularly, to systems and methods for transporting the gas turbine engine.

BACKGROUND INFORMATION

During transportation, a gas turbine engine and its internal components may be subject to shock loads. These shock loads may damage and/or degrade some of the internal components such as bearings. Various systems and methods are known in the art for reducing the impact of shock loads on a gas turbine engine and its internal components. While these known systems and methods have various advantages, there is still room in the art for improvement.

SUMMARY

According to an aspect of the present disclosure, a powerplant system is provided that includes a gas turbine engine system and an actuation system. The gas turbine engine system includes a rotating structure, a stationary structure and one or more bearings rotatably mounting the rotating structure to the stationary structure. The actuation system is configured to passively rotate the rotating structure about a rotational axis during transportation of the gas turbine engine system.

According to another aspect of the present disclosure, another powerplant system is provided that includes a gas turbine engine system and an eccentric mass. The gas turbine engine system includes a rotating structure, a stationary structure and one or more bearings rotatably mounting the rotating structure to the stationary structure. The eccentric mass is attached to the rotating structure. The eccentric mass rotationally unbalances the rotating structure about a rotational axis such that the rotational structure rotationally oscillates about a rotational axis during non-operational movement of the gas turbine engine system.

According to still another aspect of the present disclosure, a method is provided for a gas turbine engine system. During this method, the gas turbine engine system is transported from a first location to a second location, where the gas turbine engine system is non-operational during the transporting. A rotating structure is rotated within the gas turbine engine system about a rotational axis using energy from movement of the gas turbine engine system during the transporting.

The gas turbine engine system may be transported by a ground vehicle.

The method may also include arranging a mass with the rotating structure to imbalance the rotating structure about the rotational axis. The rotating structure may be passively rotated using the mass.

The method may also include biasing a rotating structure system away from a rotational equilibrium position about the rotational axis. The rotating structure system may include the rotating structure.

The method may also include damping the rotation of the rotating structure about the rotational axis.

The powerplant system may also include a spring configured bias a rotating structure system away from a rotational equilibrium position. The rotating structure system may include the rotating structure and the eccentric mass.

The powerplant system may also include a damper configured to damp the rotational oscillations of the rotating structure about the rotational axis.

The actuation system may be configured to passively rotate the rotating structure using energy from movement of the gas turbine engine system during the transportation.

The movement may include: lateral movement of the gas turbine engine system during the transportation; and/or vertical movement of the gas turbine engine system during the transportation.

The actuation system may include a mass attached to the rotating structure. The mass may rotationally imbalance the rotating structure about the rotational axis.

The actuation system may also include a spring configured bias a rotating structure system away from a rotational equilibrium position. The rotating structure system may include the rotating structure and the mass.

The actuation system may also include a damper configured to damp rotational oscillations of the rotating structure about the rotational axis.

The actuation system may include a spring configured to provide controlled rotational oscillations of the rotating structure about the rotational axis.

The actuation system may include a damper configured to damp the rotational oscillations of the rotating structure about the rotational axis.

The powerplant system may also include a cradle supporting the gas turbine engine system.

The stationary structure may be rigidly attached to the cradle.

The actuation system may be mounted to the cradle and the rotating structure.

The gas turbine engine system may be configured as part of a turbofan gas turbine engine.

The gas turbine engine system may be configured as part of a turbojet gas turbine engine.

The gas turbine engine system may be configured as part of a turboprop gas turbine engine.

The gas turbine engine system may be configured as part of a turboshaft gas turbine engine.

The gas turbine engine system may be configured as part of an auxiliary power unit.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
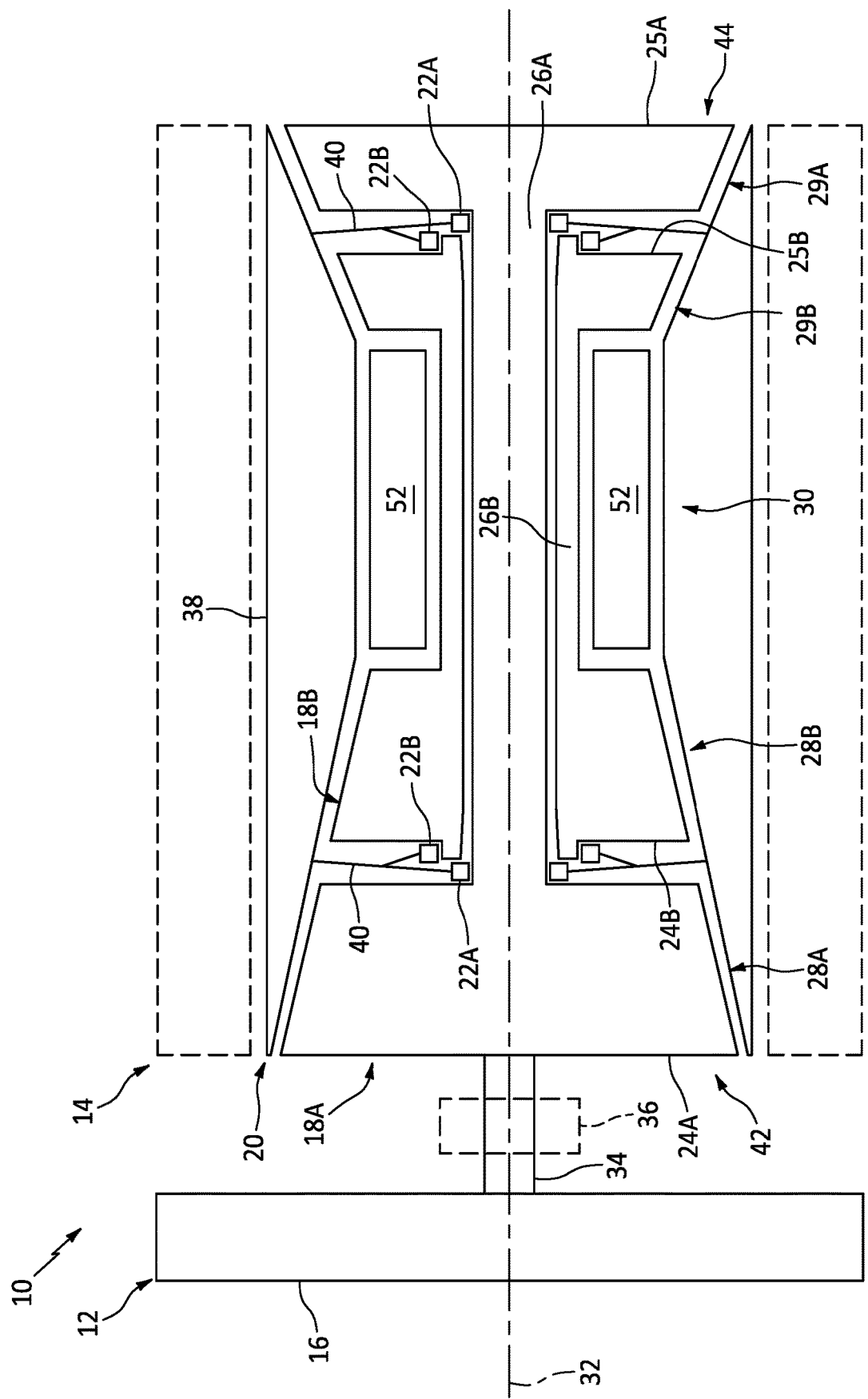
FIG. 1 is a side schematic illustration of a powerplant.

FIG. 1 is a schematic illustration of a powerplant 10 for an aircraft. This powerplant 10 may be included within an aircraft propulsion system. The powerplant 10, for example, may be configured as a turbofan gas turbine engine, a turbojet gas turbine engine, a turboprop gas turbine engine or a turboshaft gas turbine engine. The powerplant 10 may alternatively be included within an electrical power generation system. The powerplant 10, for example, may be configured as an auxiliary power unit (APU). The powerplant 10 of the present disclosure, however, is not limited to the foregoing exemplary gas turbine engine types. Furthermore, the powerplant 10 may also be configured for non-aircraft applications. The powerplant 10, for example, may be configured as a (e.g., ground-based) industrial gas turbine engine for an electrical power generation system.

The powerplant 10 of FIG. 1 includes a mechanical load 12 and a gas turbine engine system 14 configured to drive rotation of the mechanical load 12. The mechanical load 12 is configured as or otherwise includes a rotor 16 of the powerplant 10. The mechanical load 12, for example, may be configured as a bladed propulsor rotor for the aircraft propulsion system. Examples of the propulsor rotor include, but are not limited to: a fan rotor for the turbofan gas turbine engine; a compressor rotor for the turbojet gas turbine engine; a propeller rotor for the turboprop gas turbine engine; and a helicopter rotor (e.g., a main rotor) for the turboshaft gas turbine engine. The mechanical load 12 may alternatively be configured as a generator rotor for the power generation system.

The gas turbine engine system 14 of FIG. 1 includes one or more rotating structures 18A and 18B (generally referred to as "18") (e.g., spools) and a stationary structure 20. This gas turbine engine system 14 also includes one or more bearings 22A and 22B (generally referred to as "22") (e.g., rolling element bearings) for rotatably mounting the rotating structures 18 to the stationary structure 20.

The first (e.g., low speed) rotating structure 18A includes a first (e.g., low pressure (LP)) compressor rotor 24A, a first (e.g., low pressure) turbine rotor 25A and a first (e.g., low speed) shaft 26A. The first compressor rotor 24A is arranged within and part of a first (e.g., low pressure) compressor section 28A of the gas turbine engine system 14. The first turbine rotor 25A is arranged within and part of a first (e.g., low pressure) turbine section 29A of the gas turbine engine system 14. The first shaft 26A extends axially along a rotational axis 32 between and is connected to the first compressor rotor 24A and the first turbine rotor 25A.

The first rotating structure 18A may also be rotatably coupled to the mechanical load 12 and its rotor 16. The mechanical load 12 and its rotor 16, for example, may be coupled to the first rotating structure 18A through a direct drive coupling. This direct drive coupling may be configured as or otherwise include an output shaft 34. With such a direct drive coupling, the mechanical load 12 and its rotor 16 and the first rotating structure 18A may rotate at a common (e.g., the same) rotational speed. Alternatively, the mechanical load 12 and its rotor 16 may be coupled to the first rotating structure 18A through a geartrain 36 (see dashed line); e.g., a transmission. This geartrain 36 may be configured as an epicyclic geartrain. With such a geared coupling, the mechanical load 12 and its rotor 16 may rotate at a different (e.g., slower) rotational speed than the first rotating structure 18A.

The second (e.g., high speed) rotating structure 18B includes a second (e.g., high pressure (HP)) compressor rotor 24B, a second (e.g., high pressure) turbine rotor 25B and a second (e.g., high speed) shaft 26B. The second compressor rotor 24B is arranged within and part of a second (e.g., high pressure) compressor section 28B of the gas turbine engine system 14. The second turbine rotor 25B is arranged within and part of a second (e.g., high pressure) turbine section 29B of the gas turbine engine system 14. The second shaft 26B extends axially along the rotational axis 32 between and is connected to the second compressor rotor 24B and the second turbine rotor 25B. The second rotating structure 18B of FIG. 1 and its second shaft 26B axially overlap and circumscribe the first shaft 26A; however, the gas turbine engine system 14 of the present disclosure is not limited to such an exemplary arrangement.

The stationary structure 20 includes an engine case 38 and one or more bearing support structures 40. The engine case 38 is configured to at least partially or completely house the first compressor section 28A, the second compressor section 28B, a combustor section 30 of the gas turbine engine system 14, the second turbine section 29B and the first turbine section 29A, which engine sections 28A, 28B, 30, 29B and 29A may be arranged sequentially along the rotational axis 32 between an airflow inlet 42 to the gas turbine engine system 14 and an exhaust 44 from the gas turbine engine system 14. The engine case 38 of FIG. 1 axially overlaps and extends circumferentially about (e.g., completely around) the first rotating structure 18A and the second rotating structure 18B. The bearing support structures 40 are disposed within and are connected to the engine case 38. These bearing support structures 40 are configured to structurally tie the bearings 22 to the engine case 38.

Figure 2:
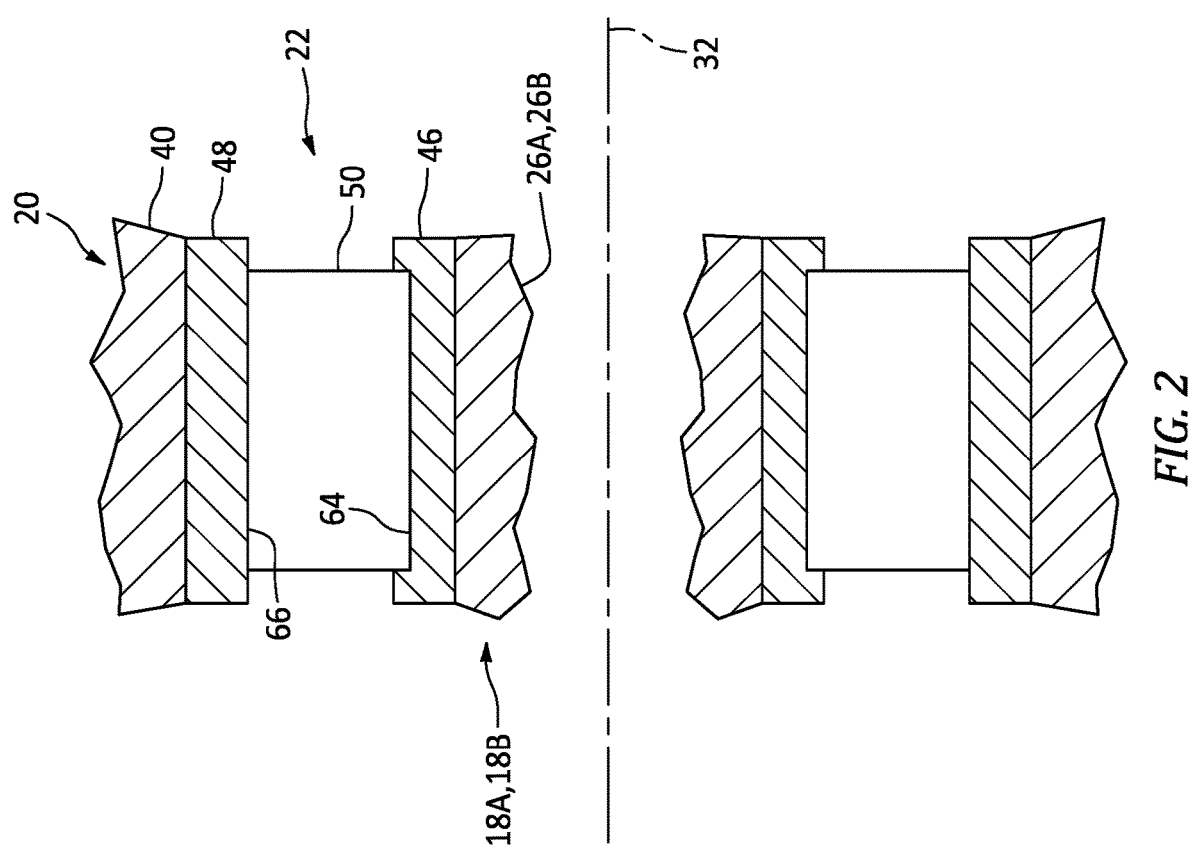
FIG. 2 is a side sectional illustration of a portion of the powerplant at a bearing rotatably mounting a rotating structure to a stationary structure.

Referring to FIG. 2, each bearing 22 may be configured as a rolling element bearing; e.g., a roller bearing. Examples of the rolling element bearing include, but are not limited to, a cylindrical roller bearing, a spherical roller bearing, a tapered roller bearing and a ball bearing. The bearing 22 of FIG. 2, for example, includes an inner race 46, an outer race 48 and a plurality of rolling elements 50. The inner race 46 circumscribes and is mounted to a respective one of the rotating structures 18; e.g., the shaft 26A, 26B (generally referred to as "26"). The outer race 48 circumscribes the inner race 46 and the rolling elements 50. The outer race 48 is mounted to the stationary structure 20 and a respective one of its bearing support structures 40. The rolling elements 50 are arranged circumferentially about the rotational axis 32 in an annular array (e.g., radially) between the inner race 46 and the outer race 48. Each of these rolling elements 50 (e.g., radially) engages and is rotatable along the inner race 46 and/or the outer race 48. With this arrangement, each bearing 22 rotatably mounts the respective rotating structure 18 and its shaft 26 to the respective bearing support structure 40. The rotating structure 18 is thereby configured to rotate about the rotational axis 32.

Referring to FIG. 1, during operation of the powerplant 10, air enters the gas turbine engine system 14 through the airflow inlet 42. This air is directed into at least a core flowpath which extends sequentially through the engine sections 28A, 28B, 30, 29B and 29A (e.g., an engine core) to the exhaust 44. The air within this core flowpath may be referred to as "core air".

The core air is compressed by the first compressor rotor 24A and the second compressor rotor 24B and directed into a combustion chamber 52 of a combustor in the combustor section 30. Fuel is injected into the combustion chamber 52 and mixed with the compressed core air to provide a fuel-air mixture. This fuel-air mixture is ignited and combustion products thereof flow through and sequentially cause the second turbine rotor 25B and the first turbine rotor 25A to rotate. The rotation of the second turbine rotor 25B and the first turbine rotor 25A respectively drive rotation of the second compressor rotor 24B and the first compressor rotor 24A and, thus, compression of the air received from the airflow inlet 42. The rotation of the first turbine rotor 25A also drives rotation of the mechanical load 12 and its rotor 16. Where the rotor 16 is configured as the propulsor rotor, the rotor 16 propels additional air through or outside of the gas turbine engine system 14 to provide, for example, a majority of aircraft propulsion system thrust. Where the rotor 16 is configured as the generator rotor, rotation of the rotor 16 facilitates generation of electricity.

Figure 3:
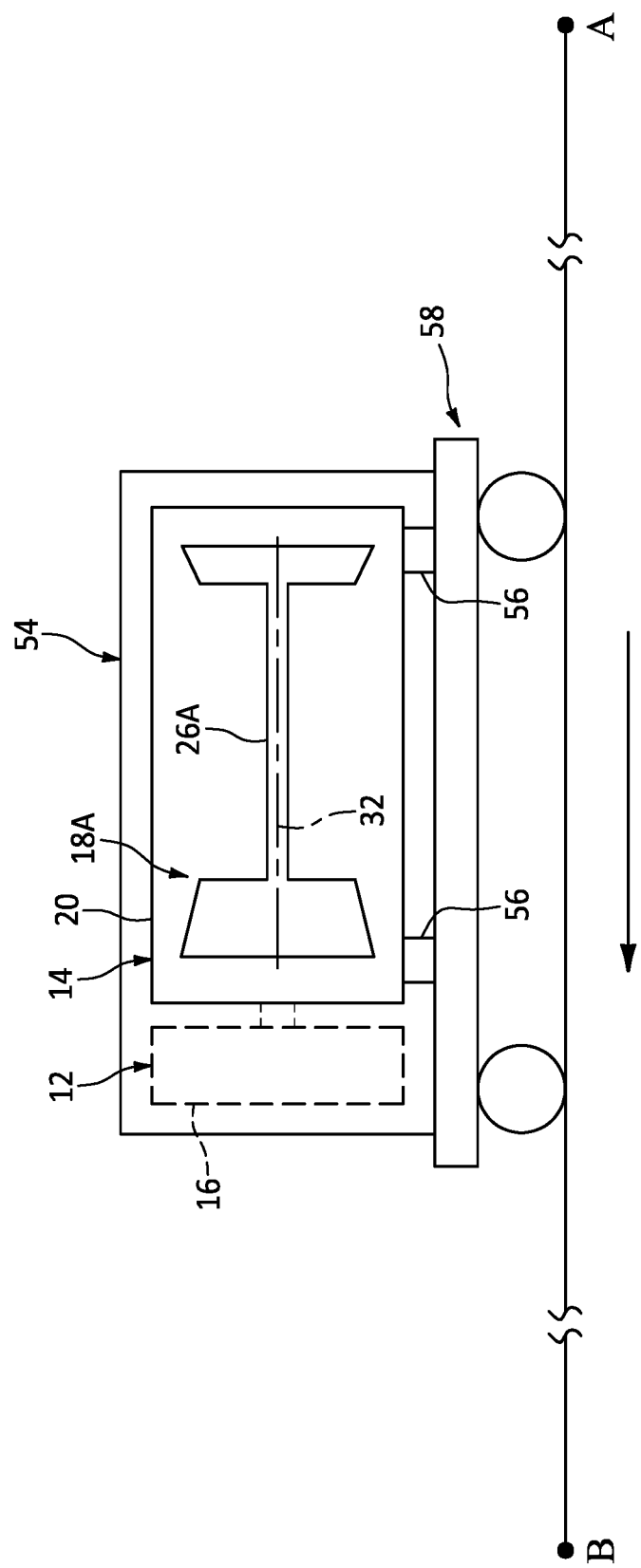
FIG. 3 is a side schematic illustration of a gas turbine engine system supported by a cradle on a vehicle, where the vehicle is travelling from a first location to a second location.

FIG. 3 illustrates a system for the powerplant 10 where the gas turbine engine system 14 supported by a cradle 54; e.g., a storage and/or shipment support, fixture, frame, etc. The gas turbine engine system 14 is secured to the cradle 54 for storage and/or transportation of the gas turbine engine system 14. The stationary structure 20, for example, may be fixedly attached to the cradle 54 (e.g., via one or more mounts 56) such that the stationary structure 20 does not move relative to the cradle 54. While supported by the cradle 54, the gas turbine engine system 14 may be referred to as a "cradled gas turbine engine system".

The mechanical load 12 and its rotor 16 may be connected to the cradled gas turbine engine system 14. Alternatively, the mechanical load 12 and its rotor 16 may be disconnected from the cradled gas turbine engine system 14 where, for example, the mechanical load 12 and its rotor 16 are stored and/or shipped discrete from the gas turbine engine system 14.

During transportation of the gas turbine engine system 14 from a first location A (e.g., a powerplant assembly facility) to a second location B (e.g., an aircraft assembly facility), the cradled gas turbine engine system 14 may be loaded onto a vehicle 58 for shipment; e.g., a ground vehicle such as a truck, a train, etc. The vehicle 58 may then transport the cradled gas turbine engine system 14 (with or without the mechanical load 12) at least partially or completely between the first location A and the second location B.

During transportation of the gas turbine engine system 14, the vehicle 58 may move up-and-down (e.g., direction 60 in FIG. 4), move side-to-side (e.g., direction 62 in FIG. 4), bounce, vibrate and/or otherwise be jostled about. This vehicle jostling may be caused by, for example, imperfections (e.g., bumps, holes, etc.) in a road, poor and/or worn vehicle suspension, etc. The vehicle jostling may subject the cradled gas turbine engine system 14 and its various components to relatively large (e.g., momentary, periodic, etc.) loads; e.g., shock loads. When the rotating structures 18 are not rotating about the rotational axis 32, such loads may damage one or more internal components such as the bearings 22. The static rolling elements 50 of FIG. 2, for example, may form one or more depressions (e.g., imprints, indentations, etc.) in an (e.g., cylindrical) outer surface 64 of the inner race 46 and/or an (e.g., cylindrical) inner surface 66 of the outer race 48. This bearing damage may be characterized as "brinelling" or "false brinelling". The gas turbine engine system 14 (see FIG. 1) and one or more of its bearings 22 may thereby need maintenance and/or repair even before assembly on, for example, an aircraft, which increases costs and downtime.

Figure 4:
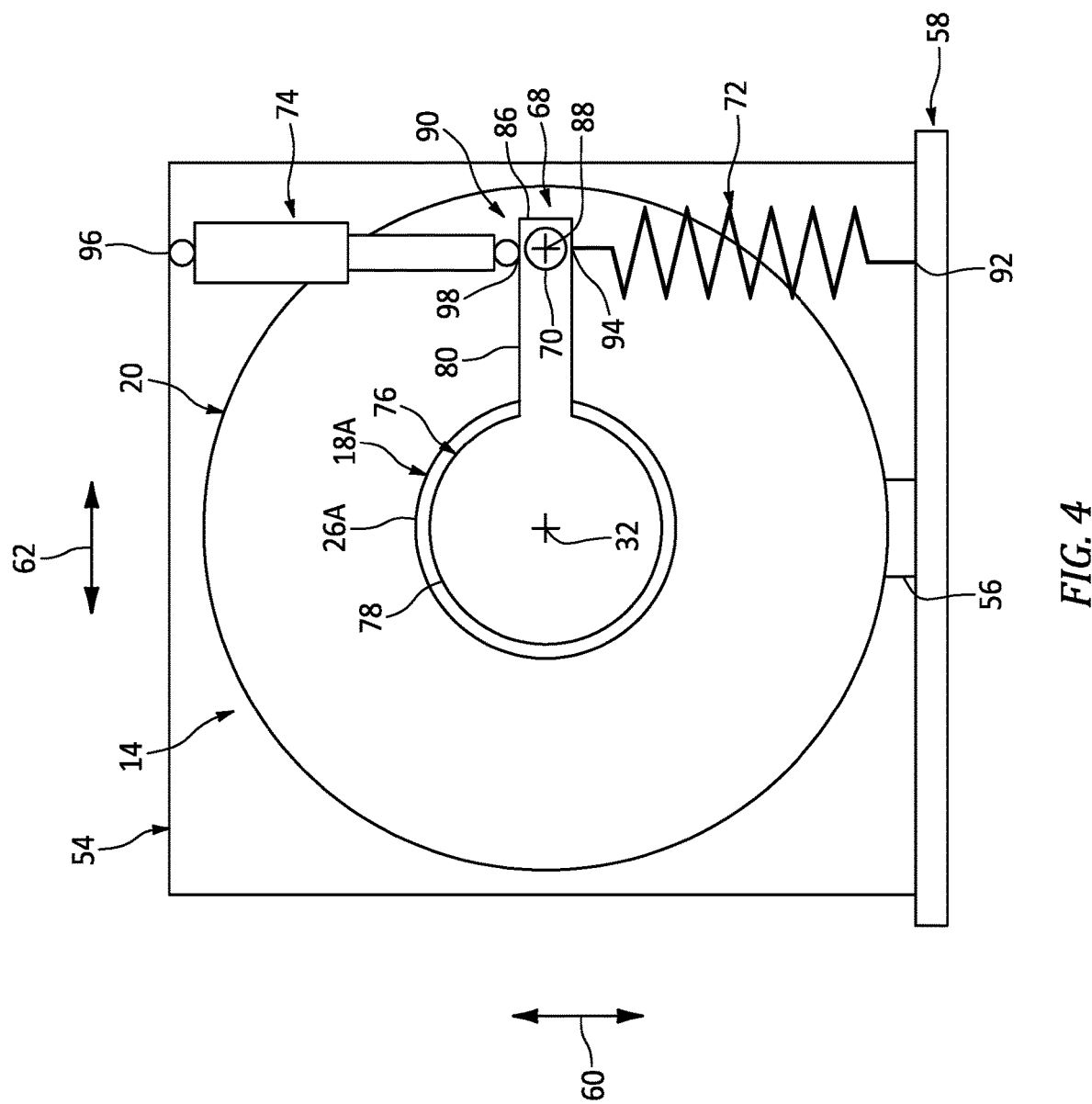
FIG. 4 is an end schematic illustration of a cradled gas turbine engine system configured with a passive actuation system, where an actuation system fixture is mounted to a rotating structure shaft.

FIG. 4 illustrates a passive actuation system 68 configured with the cradled gas turbine engine system 14. This actuation system 68 is configured to passively rotate (e.g., oscillate) at least one of the rotating structures 18 (e.g., 18A) about its rotational axis 32 while the powerplant 10 (see FIG. 1) and its gas turbine engine system 14 are non-operational. The actuation system 68 of FIG. 4, for example, is configured to passively rotate the first rotating structure 18A during transportation of the cradled gas turbine engine system 14. By rotating the first rotating structure 18A about the rotational axis 32, the bearings 22A (see FIGS. 1 and 2) supporting the first rotating structure 18A may be less susceptible to damage such as brinelling/false brinelling.

Figure 5:
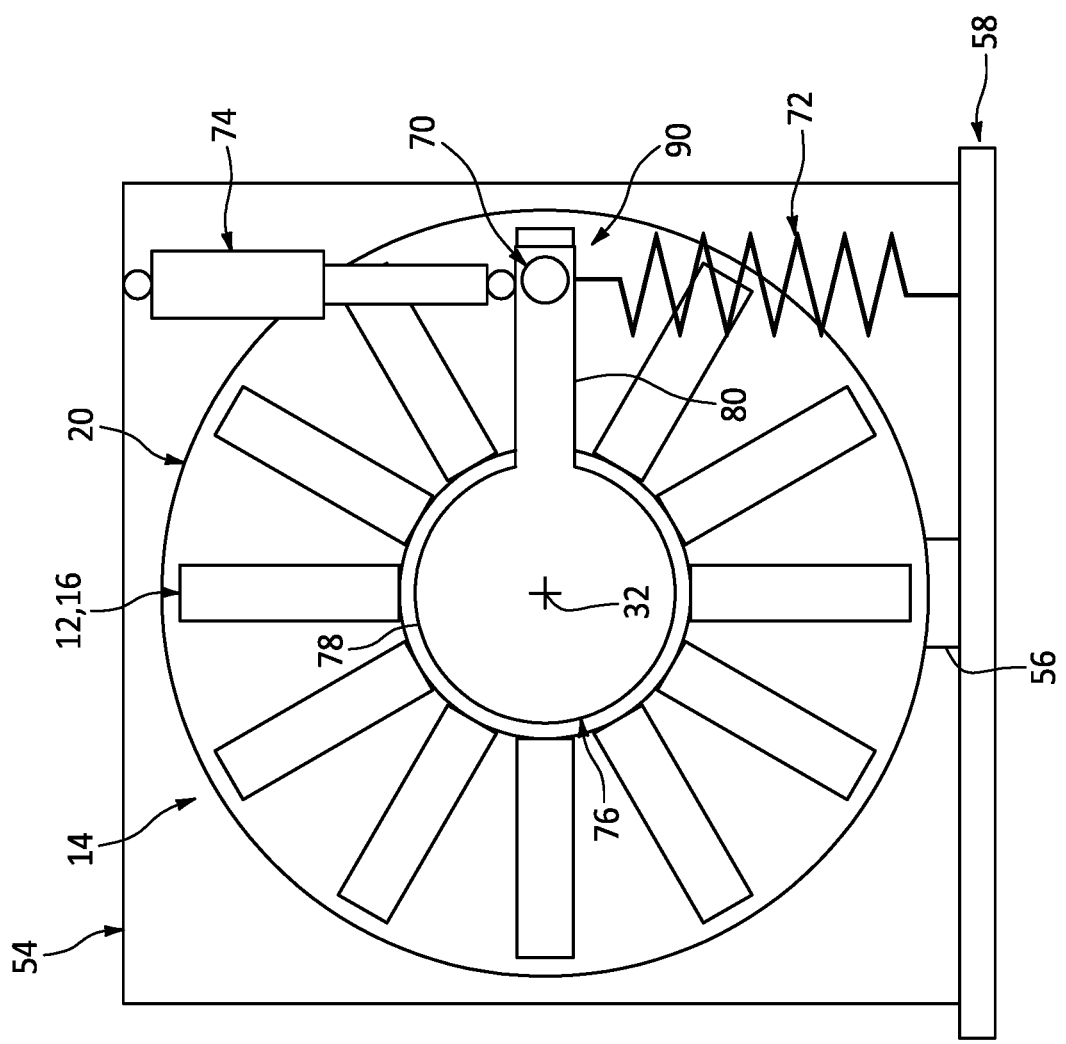
FIG. 5 is an end schematic illustration of the cradled gas turbine engine system configured with the actuation system, where the actuation system fixture is mounted to a bladed rotor.
Figure 6:
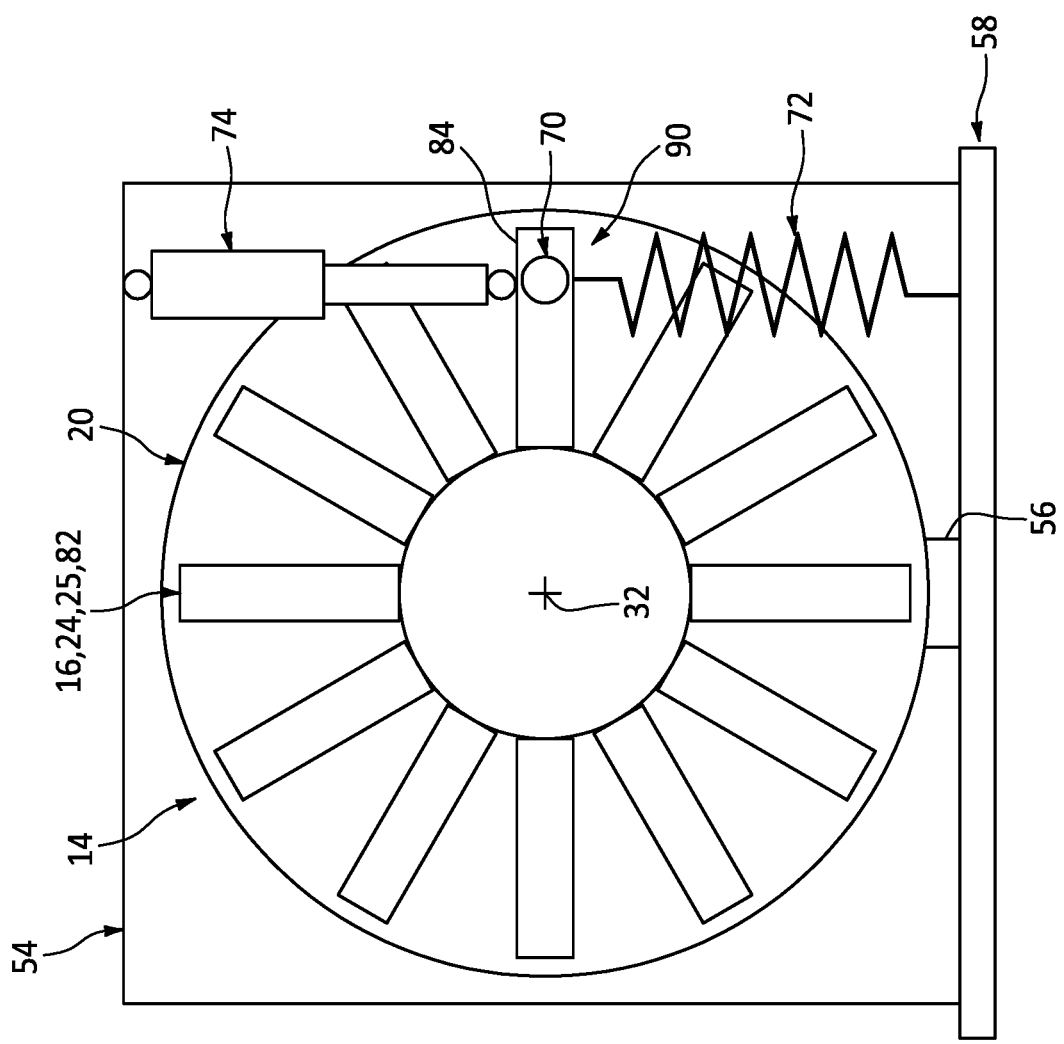
FIG. 6 is an end schematic illustration of the cradled gas turbine engine system configured with the actuation system, where the actuation system is configured without a fixture.

The actuation system 68 of FIG. 4 includes an eccentric mass 70, a spring 72 and a damper 74. The actuation system 68 of FIG. 4 also includes a fixture 76 for attaching the mass 70 to the first rotating structure 18A. This fixture 76 of FIG. 4 includes a hub 78 and a lever arm 80 connected to and projecting radially out from the hub 78 and the rotational axis 32. The hub 78 is coupled to the first rotating structure 18A. The hub 78 of FIG. 4, for example, is attached to the first shaft 26A via, for example, a bolted connection. However, referring to FIG. 5, the fixture 76 and its hub 78 my alternatively be indirectly attached to the first rotating structure 18A (see FIG. 1) through at least (or only) one intermediate component; e.g., the mechanical load 12 and its rotor 16. In still other embodiments, referring to FIG. 6, the fixture 76 may be omitted and the mass 70 may be coupled to the first rotating structure 18A in another manner. The mass 70 of FIG. 6, for example, is attached directly to a rotor 82; e.g., a bladed rotor. This rotor 82 may be one of the gas turbine engine system rotors 24A, 25A or the mechanical load rotor 16. In such embodiments, a respective one of the rotor blades 84 may function as the lever arm 80.

The mass 70 of FIG. 4 is configured to rotationally imbalance the first rotating structure 18A about the rotational axis 32. The mass 70 of FIG. 4, for example, is attached to (or integral with) the lever arm 80 at (e.g., on, adjacent or proximate) or radially towards a distal outer end 86 of the lever arm 80. With such an arrangement, at least a center of gravity 88 of the mass 70 (or an entirety of the mass 70) may be spaced a radial distance from the rotational axis 32. The mass 70 may be similarly located radially out from the rotational axis 32 when otherwise coupled to the first rotating structure 18A; e.g., see FIG. 6.

Figure 7:
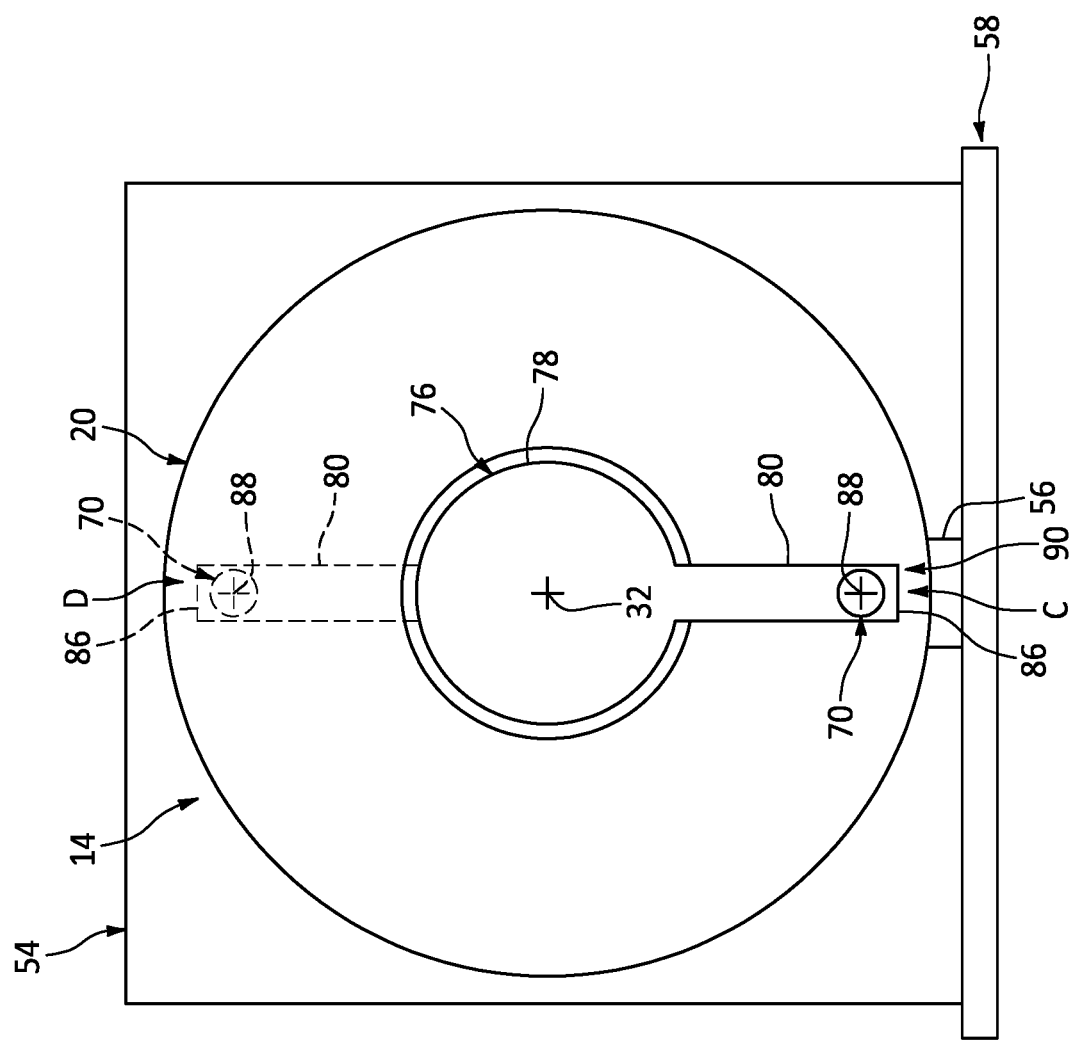
FIG. 7 is an end schematic illustration of the cradled gas turbine engine system configured with a portion of the actuation system, where an eccentric mass is at a static rotational equilibrium position.

The spring 72 of FIG. 4 is configured to bias a rotating structure system 90 away from a static rotational equilibrium position. The rotating structure system 90, for example, may have a stable rotational equilibrium position where the center of gravity 88 of the mass 70 is located at a gravitational bottom center position (see position C in FIG. 7). The rotating structure system 90 may have an unstable rotational equilibrium position where the center of gravity 88 of the mass 70 is located at a gravitational top center position (see position D in FIG. 7). The rotating structure system 90 of FIG. 4 includes at least (or only) the first rotating structure 18A, the mass 70 and the fixture 76. The rotating structure system 90 of FIG. 5 includes at least (or only) the mechanical load rotor 16, the first rotating structure 18A, the mass 70 and the fixture 76. The rotating structure system 90 of FIG. 6 includes at least (or only) the rotor 82, the first rotating structure 18A and the mass 70.

Referring to FIG. 4, the spring 72 extends between and is connected to a stationary object and the rotating structure system 90. The spring 72 of FIG. 4, for example, extends between and to a first end 92 of the spring 72 and a second end 94 of the spring 72. This spring 72 is attached to the cradle 54 (or the stationary structure 20, or another object) at the spring first end 92. The spring 72 is attached to the fixture 76 and its lever arm 80 at the spring second end 94. The spring 72 of FIG. 4 is configured to maintain a position of the mass 70 (and its center of gravity 88) to a lateral (e.g., right or left) side of the rotational axis 32. The spring 72 may thereby maintain the rotating structure system 90 out of its bottom and/or its top static rotational equilibrium positions (see FIG. 7).

The spring 72 may be configured as a coil spring. Alternatively, the spring 72 may be configured as a torsion spring, a resistance band (e.g., an elastic band) or any other type of resilient device.

The damper 74 is configured to damp rotational movement of the rotating structure system 90 and its first rotating structure 18A about the rotational axis 32. The damper 74 extends between and is connected to a stationary object and the rotating structure system 90. The damper 74 of FIG. 4, for example, extends between and to a first end 96 of the damper 74 and a second end 98 of the damper 74. This damper 74 is attached to the cradle 54 (or the stationary structure 20, or another object) at the damper first end 96. The damper 74 is attached to the fixture 76 and its lever arm 80 at the damper second end 98. In the embodiment of FIG. 4, the fixture 76 and its lever arm 80 are disposed between the spring 72 and the damper 74. The present disclosure, however, is not limited to such an exemplary arrangement. The spring 72 and the damper 74, for example, may alternatively be arranged on a common side of the fixture 76 and its lever arm 80.

Figure 8:
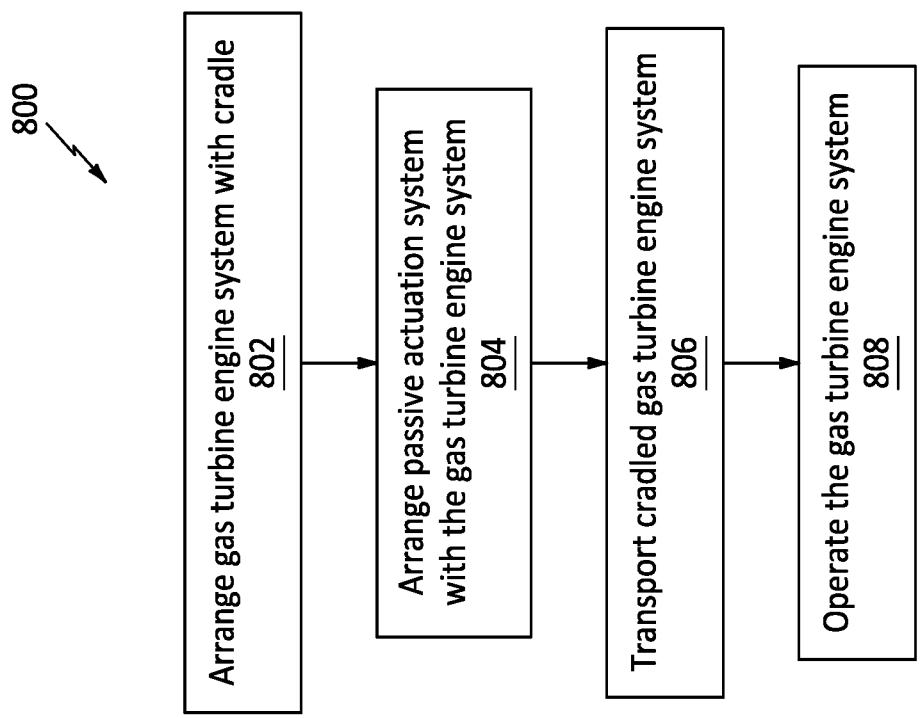
FIG. 8 is a flow diagram of a method for transporting the powerplant.

FIG. 8 is a flow diagram of a method 800 for transporting the powerplant 10 and its gas turbine engine system 14. For ease of description, the method 800 is described with respect to the actuation system 68 described herein. The method 800 of the present disclosure, however, is not limited to any particular actuation system types or configurations. The method 800 of the present disclosure is also not limited to the above exemplary powerplant configuration.

In step 802, the gas turbine engine system 14 is arranged with the cradle 54 to provide the cradled gas turbine engine system 14.

In step 804, the actuation system 68 is arranged with the gas turbine engine system 14. This step 804 may occur before, during and/or after the performance of the step 802.

In step 806, the cradled gas turbine engine system 14 is transported; e.g., from the first location A to the second location B. During this transportation, the vehicle 58 transporting the cradled gas turbine engine system 14 may move laterally side-to-side and/or vertically up-and-down. The actuation system 68 may passively transform this laterally side-to-side (see direction 62 in FIG. 4) and/or vertically up-and-down movement (see direction 60 in FIG. 4) into rotational movement of the rotating structure system 90 and its first rotating structure 18A about the rotational axis 32. More particularly, the movement of the vehicle 58 and, thus, the corresponding movement of the cradled gas turbine engine system 14 may disrupt a static equilibrium of the rotating structure system 90; e.g., a position maintained by the spring 72 when the cradled gas turbine engine system 14 is stationary. The rotating structure system 90 may thereby begin to rotationally oscillate about the rotational axis 32. For example, when the vehicle 58 and the cradled gas turbine engine system 14 move vertically up quickly (e.g., hitting a bump in a road), the mass 70 and its center of gravity 88 may move down vertically. A force of the spring 72 may then cause the mass 70 and its center of gravity 88 to move back vertically up thereby starting or continuing the oscillations. By contrast, when the vehicle 58 and the cradled gas turbine engine system 14 move vertically down quickly (e.g., hitting a pothole in the road), the mass 70 and its center of gravity 88 may move up vertically. A force of the spring 72 may then cause the mass 70 and its center of gravity 88 to move back vertically down thereby starting or continuing the oscillations. This movement of the rotating structure system 90 may reduce or prevent damage (e.g., brinelling/false brinelling) to at least the bearings 22A supporting the first rotating structure 18A during the transportation of the gas turbine engine system 14. The rotational oscillations of the rotating structure system 90 may be damped via the damper 74 such that the rotational oscillations are relatively slow, controlled and smooth.

To facilitate the rotational movement (e.g., oscillations) of the rotating structure system 90, the mass 70 is eccentrically positioned such that a weight of the mass 70 is greater than an inertia of the rotating structure system 90 and/or expected transportation accelerations from side-to-side and/or up-and-down shifts. A spring constant of the spring 72 and/or a damping constant of the damper 74, however, may be relatively low to keep the rotating structure system 90 minimally unstable.

In step 808, the gas turbine engine system 14 is operated. For example, at the second location B (e.g., a destination), the actuation system 68 is removed from the gas turbine engine system 14. The gas turbine engine system 14 may (e.g., then) be removed from the cradle 54 and configured for test operation in a test stand (or alternatively in the cradle 54). The gas turbine engine system 14 may alternatively be assembled with an aircraft, and subsequently operated for testing and/or aircraft flight. During operation of the powerplant 10, the actuation system 68 is decoupled from the gas turbine engine system 14. Thus, the actuation system 68 passively rotates the first rotating structure 18A while the gas turbine engine is non-operational as described above.

The actuation system 68 and the method 800 are described above with respect to a single lever arm 80, a single mass 70, a single spring 72 and a single damper 74. The present disclosure, however, is not limited to such a singular configuration. The actuation system 68, for example, may include multiple masses 70 where the masses 70 are arranged such that the rotating structure system 90 is rotationally imbalanced. The actuation system 68 may also or alternatively include one or more additional springs 72 and/or dampers 74. Alternatively, it is contemplated the actuation system 68 may be configured without one or more of the elements 72 and/or 74. The actuation system 68, for example, may alternatively be configured without a spring 72 and/or a damper 74.

While the actuation system 68 is described above for passively rotating the first rotating structure 18A, the actuation system 68 may also or alternatively passively rotate the second rotating structure 18B. The actuation system 68, for example, may be rotationally coupled to the second rotating structure 18B (and/or still another rotating assembly) through, for example, an accessory gearbox. Of course, in other embodiments, the powerplant 10 and its gas turbine engine assembly may be configured without the second rotating structure 18B; e.g., the powerplant 10 may be configured as a single spool gas turbine engine.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant system, comprising:
    a gas turbine engine system including a rotating structure, a stationary structure and one or more bearings rotatably mounting the rotating structure to the stationary structure; and
    an eccentric mass attached to the rotating structure, the eccentric mass rotationally unbalancing the rotating structure about a rotational axis such that the rotational structure rotationally oscillates about a rotational axis during non-operational movement of the gas turbine engine system.

2. The powerplant system of claim 1, further comprising a spring configured bias a rotating structure system away from a rotational equilibrium position, the rotating structure system including the rotating structure and the eccentric mass.

3. The powerplant system of claim 1, further comprising a damper configured to damp the rotational oscillations of the rotating structure about the rotational axis.

4. The powerplant system of claim 1, wherein the gas turbine engine system is configured as part of one of
    a turbofan gas turbine engine;
    a turbojet gas turbine engine;
    a turboprop gas turbine engine;
    a turboshaft gas turbine engine; or
    an auxiliary power unit.

5. A method for a gas turbine engine system, comprising:
    arranging a mass with the rotating structure to imbalance the rotating structure about the rotational axis;
    transporting the gas turbine engine system from a first location to a second location, wherein the gas turbine engine system is non-operational during the transporting; and
    rotating a rotating structure within the gas turbine engine system about a rotational axis using energy from movement of the gas turbine engine system during the transporting, wherein the rotating structure is rotated using the mass.

6. The method of claim 5, wherein the gas turbine engine system is transported by a ground vehicle.

7. The method of claim 5, further comprising:
    biasing a rotating structure system away from a rotational equilibrium position about the rotational axis;
    wherein the rotating structure system comprises the rotating structure.

8. The method of claim 5, further comprising damping the rotation of the rotating structure about the rotational axis.

9. A powerplant system, comprising:
    a gas turbine engine system including a rotating structure, a stationary structure and one or more bearings rotatably mounting the rotating structure to the stationary structure; and
    an actuation system comprising a spring, the spring configured to provide controlled rotational oscillations of the rotating structure about a rotational axis, wherein the controlled rotational oscillations facilitate rotation of the rotating structure about the rotational axis during transportation of the gas turbine engine system.

10. The powerplant system of claim 9, wherein the gas turbine engine system is configured as part of one of
    a turbofan gas turbine engine;
    a turbojet gas turbine engine;
    a turboprop gas turbine engine;
    a turboshaft gas turbine engine; or
    an auxiliary power unit.

11. The powerplant system of claim 9, wherein
    the actuation system further comprises a damper;
    the damper is configured to damp the rotational oscillations of the rotating structure about the rotational axis.

12. The powerplant system of claim 9, wherein
    the actuation system further comprises a mass attached to the rotating structure; and
    the mass rotationally imbalances the rotating structure about the rotational axis.

13. The powerplant system of claim 12, wherein
    the spring is configured bias a rotating structure system away from a rotational equilibrium position; and
    the rotating structure system includes the rotating structure and the mass.

14. The powerplant system of claim 13, wherein
    the actuation system further comprises a damper; and
    the damper is configured to damp the rotational oscillations of the rotating structure about the rotational axis.

15. The powerplant system of claim 9, further comprising a cradle supporting the gas turbine engine system.

16. The powerplant system of claim 15, wherein the stationary structure is rigidly attached to the cradle.

17. The powerplant system of claim 15, wherein the actuation system is mounted to the cradle and the rotating structure.

* * * * *